Patented Jan. 16, 1923.

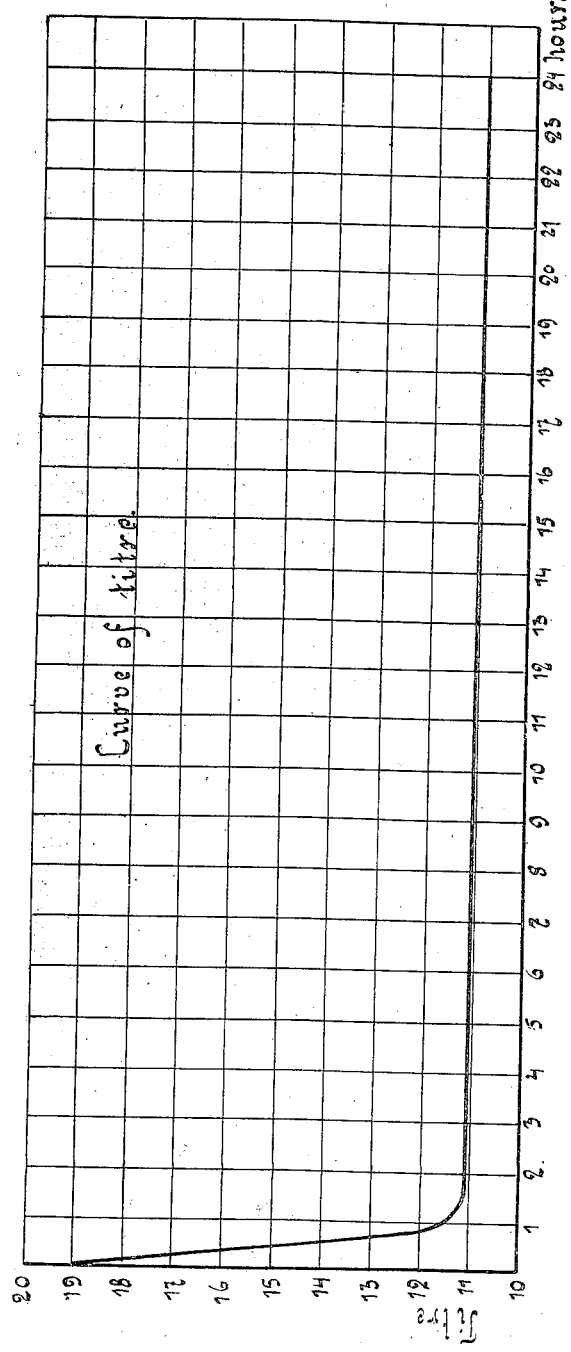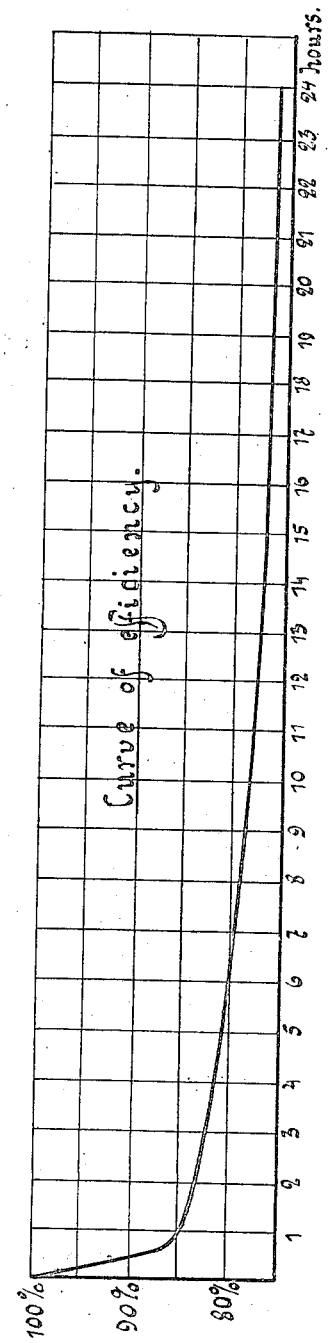

1,442,322

UNITED STATES PATENT OFFICE.

ERNST BECKMANN, OF BERLIN-DAHLEM, GERMANY, ASSIGNOR, BY MESNE ASSIGNMENTS, TO THE CHEMICAL FOUNDATION, INC., A CORPORATION OF DELAWARE.

PROCESS FOR PREPARING A FODDER FROM STRAW AND SIMILAR MATERIALS.

Application filed August 11, 1919. Serial No. 316,833.

*To all whom it may concern:*

Be it known that I, Professor Dr. ERNST BECKMANN, a citizen of the State of Germany, and residing at Berlin-Dahlem, Thielallee 63, Germany, have invented certain new and useful Improvements in or Relating to a Process for Preparing a Fodder from Straw and Similar Materials (for which I have filed an application in Germany August 9, 1918), of which the following is a specification.

In the preparation of fodder from straw or similar substances characterized by a content of raw fibres, such as, for example, rush-forest grass, chaff, indian grass, stalks, and the like, by disintegrating such material in a chopped-up condition by means of alkaline liquors, it has been previously suggested to boil or to cause the liquor to act upon the straw at an elevated temperature or under steam pressure instead of solely at ordinary temperature, that is without additional heat, for a longer or shorter period according to the concentration of the liquor. The duration of the treatment is continued for the purpose of disintegrating as completely as possible and to obtain a practically complete softening of all knots of the straw.

The inventor has learned from his experiments what the rate of consumption of alkali is while the liquor is acting upon the straw, with what speed the straw substances are dissolved, what is the influence of the temperature upon the speed of these reactions and finally what is the digestibility of straw disintegrated for a longer or shorter period of time.

It has been shown that the highest consumption of alkali takes place at the beginning of the disintegrating process. During the first $1\frac{1}{2}$ hours for instance at about $15°$ C., and when treating rye-straw by means of $1\frac{1}{2}\%$ alkali the greatest part of the alkali necessary for the disintegrating process is consumed and after this time only a relatively small consumption takes place.

The solution of the straw substances is most marked at the beginning of the disintegrating process. It diminishes, like the consumption of alkali, in a steeply falling curve so that at a medium summer-temperature, a $1\frac{1}{2}\%$ liquor acting upon winter-rye-straw after 3 to 12 hours a point is reached from which point on only a relatively slight solution of straw substances takes place. The knots of the straw are not completely softened during this treatment.

In the wintertime and at temperatures as low as the freezing point of the liquor ($-1\frac{1}{2}°$ C.) the process is also applicable but the duration of the action must be somewhat lengthened.

An instance is shown in the annexed drawing. It illustrates the curves of titre and of efficiency for a disintegrating process, utilized with straw at an ordinary temperature with a $1\frac{1}{2}\%$ disintegrating liquor and with a weight of liquor 8 times greater than that of the straw.

The curve of titre shows the titre as ordinate and the time of action as abscissa. It is evident that the whole reduction of titre takes place within the first $1\frac{1}{2}$ hours. The titre falls within this time from 10 to 11 and remains stationary during the remainder of the action which is extended to 24 hours.

In the curve of efficiency the percentages of the quantities of fodder in relation to the straw originally taken for treatment are placed as ordinates and again the time is placed as abscissa. The loss of straw corresponds to the dissolved substance. The curve shows that after one hour the efficiency is about 84%. During this time consequently 16% of the straw is dissolved. The solution then becomes slower, after 6 hours 20% of the straw is dissolved, after 12 hours 25%, subsequently to this period the solution of the straw substances increases but very little. Within the next 12 hours it amounts to only one per cent.

According to the instance cited after $1\frac{1}{2}$ hours a serviceable fodder would be obtained. The process may of course be continued to 12 hours if a more complete solution of straw substance is desired. A treatment of more than 12 hours does not appear to be necessary.

It seems accordingly that the process operates in such a way that in the first period of time ($1\frac{1}{2}$–3 hours) the stalks of the straw are almost completely disintegrated whereas the liquor penetrates into the knots less strongly. When the straw is retained in the liquor the same acts upon the knots although further substances are at the same time dissolved from the stalks. The disintegrating process is interrupted when the consumption of alkali as well as the solution of the straw substances do not essentially increase. A well disintegrated straw is obtained, the knots of which however are not completely softened.

Feeding experiments have shown that such straw is readily digestible. The reason may lie in the fact that on account of the knots not being entirely softened the animal is compelled to chew the fodder—perhaps but slightly—and that by the salivation thus taking place digestion is promoted. On the other hand, even if the knots are considered indigestible the content of these indigestible parts is relatively small since the knots constitute only about 7% of the total quantity of straw.

A further advantage of the shorter duration of the disintegrating process lies in the fact that the aromatic substances of the straw which stimulate the appetite of the animal are more completely conserved.

Accordingly the disintegrating process being interrupted in the way defined the following advantages are obtained: A considerable economy of time takes place inasmuch as the disintegrating process is brought to an end within a short period of time, i. e., 1½–12 hours according to the concentration of the liquor. This condition affords, of course, an economy of space as the barrels or receptacles employed for the disintegrating process may be much smaller for the same daily output, the cost of the process is reduced. Furthermore the efficiency is somewhat higher, since not so many digestible parts are removed from the straw as in the cases in which the liquor acts for 36 or more hours. On the other hand the straw is disintegrated to such an extent as to be easily digestible. At the same time, as already noted, it is essential that to a certain degree the animal be compelled to chew which is a condition aimed at in somewhat similarly produced fodders by the adding of chopped straw to said fodder.

The present invention accordingly intends to decrease the cost and the duration of the disintegrating process for straw and like materials without a reduction in the digestibility of the same. This advantage is obtained by the disintegrating process being discontinued after a certain period. This period is, as already remarked, indicated when the consumption of the alkali and the solution of the straw substance do not essentially increase. For example, with straw of winter-rye at medium temperature and using a 1½ to 2% liquor this interval is after an action of 3 to 12 hours. The duration of the period depends upon the actual temperature, the concentration of the liquor, the quality and the condition of the material to be disintegrated.

Having now described my invention, what I claim is:—

1. A process for the preparation of fodder from straw and similar materials characterized by a content of raw fibres which consists in disintegrating such material in a chopped-up condition by means of alkaline liquors, the disintegrating process being discontinued when the consumption of alkali does not substantially increase.

2. A process for the preparation of fodder from straw and similar materials characterized by a content of raw fibres which consists in disintegrating such material in a chopped-up condition by means of alkaline liquors at ordinary temperature, the disintegrating process being discontinued after a period of from one and a half to twelve hours.

3. A process for the preparation of fodder from straw and similar materials characterized by a content of raw fibres which consists in disintegrating such material in a chopped-up condition by means of alkaline liquors at ordinary temperature, the disintegrating process being discontinued after a period of about three hours.

4. A process for the preparation of fodder from straw and similar materials characterized by a content of raw fibres which consists in disintegrating said material in a chopped-up condition by means of an alkaline liquor having a concentration of about one-half to two per cent at a temperature of about twenty degrees centigrade, the process being discontinued after a period of about three hours.

In testimony whereof I have affixed my signature in presence of two witnesses.

PROF. DR. ERNST BECKMANN.

Witnesses:
    JENNE KROCHN,
    GERTRUDE TRUSCHKE.